June 19, 1945.  T. HELLEBERG ET AL  2,378,849
DEVICE FOR DETERMINING THE VOLUME
OF GAS OR LIQUID IN RECEPTACLES
Filed Oct. 17, 1941
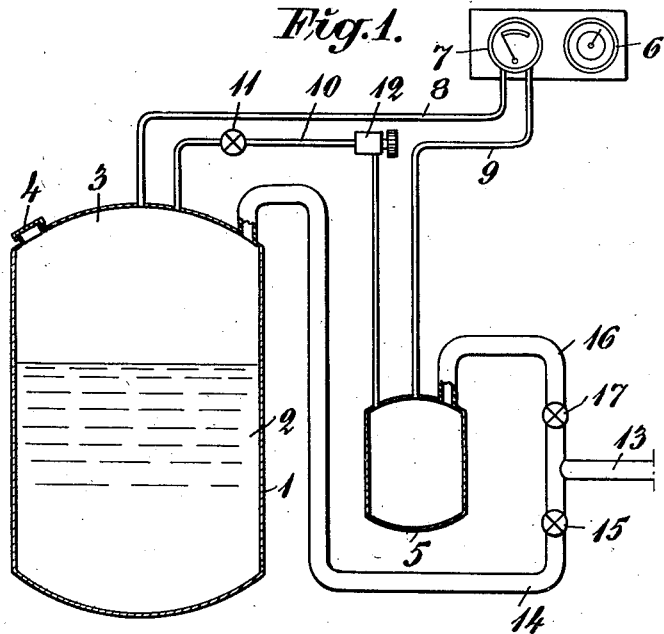
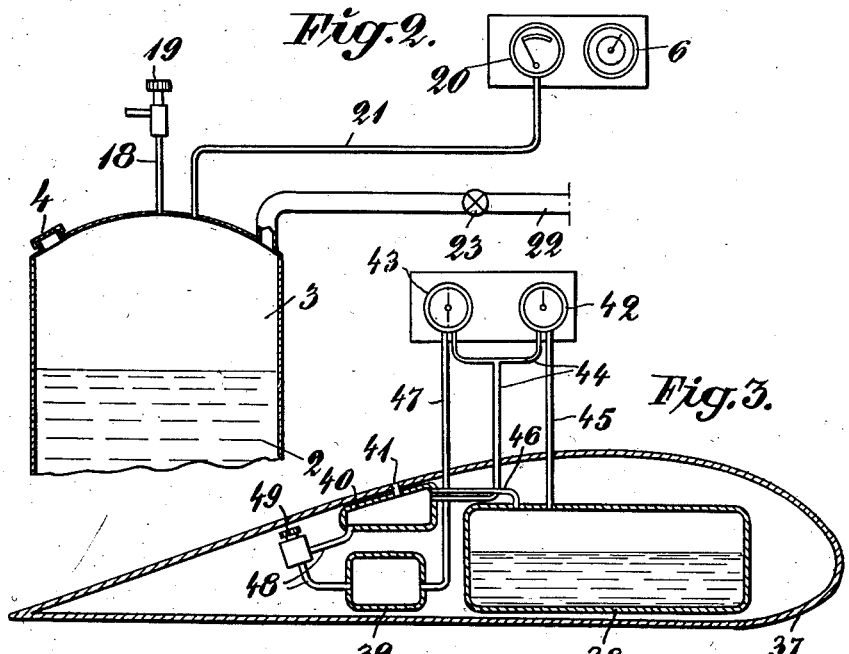
Inventors:
TORE HELLEBERG
SVEN MALMSTROM
By Stevens and Davis
Attorneys Patented June 19, 1945

2,378,849

UNITED STATES PATENT OFFICE 2,378,849

DEVICE FOR DETERMINING THE VOLUME OF GAS OR LIQUID IN A RECEPTACLE

Tore Helleberg, Stockholm, and Sven Malmström, Linkoping, Sweden

Application October 17, 1941, Serial No. 415,474
In Sweden October 25, 1940

3 Claims. (Cl. 73—290)

The invention relates to a device for determining the volume of gas or liquid in a receptacle, which is filled in part with a liquid and for the rest with a gas, e. g. air, and which is connected by means of a pressure equalizing pipe with the atmosphere and/or an auxiliary receptacle filled with gas, e. g. air.

According to the invention the said device is improved in such a manner that an air pump or another source of pressure for producing a certain difference between the gas pressure in the receptacle and the atmospheric pressure or the gas pressure in the auxiliary receptacle is so combined with a time meter and a manometer that when this difference of pressure is reduced to a certain value or if this reducing progresses during a certain time, the time measured by the time meter or the final value of the difference of pressure measured by the manometer is a measure for the volume of gas in the receptacle.

The device according to the invention can be used for instance for measuring the quantity of fuel contained in the fuel tanks of aeroplanes because the values measured by the time meter and the manometer are also correct, if the aeroplane is in the inclined position.

Three embodiments of the device according to the invention are illustrated in the drawing.

Fig. 1 shows an embodiment with a closed receptacle,

Fig. 2 an embodiment with a receptacle connected with the atmosphere, and

Fig. 3 an embodiment for aeroplanes.

In Fig. 1 the receptacle 1 is filled partially with a liquid 2 and for the rest with a gas 3. A liquid inlet 4 closed by a cap is arranged on the upper part of the receptacle 1. The device includes, besides, an auxiliary receptacle 5 filled with gas, a time meter 6 and a differential manometer 7 connected with the receptacle 1 through a pipe 8 and with the auxiliary receptacle 5 through a pipe 9. The receptacle 1 and the auxiliary receptacle 5 are connected to each other by a pressure equalizing pipe 10 which contains a stop-valve 11 and a needle valve 12. The needle valve 12 serves to adjust the desired resistance to the flow of gas in the pipe 10. Moreover, an air pump not illustrated in the drawing forms a part of the device and can be a suction or pressure pump which is connected by means of a pipe 13 and branch-pipes 14, 16 provided with stop-valves 15, 17 with the receptacle 1 and the auxiliary receptacle 5.

The volume of liquid or gas contained in the receptacle 1 can be determined in the following manner by determining the volume of gas.

With valve 11 closed, the valve 15 or the valve 17 is opened, and the air pump is working until the differential manometer 7 indicates a certain difference between the pressure in the receptacle 1 and the pressure in the auxiliary receptacle 5. Now the opened valve is closed, and the stop-valve 11 of the pipe 10, the needle valve of which is adjusted to a definite opening, is opened. By this way the difference of pressure is gradually reduced, and the time which passes until this difference is reduced to a previously fixed value is measured by means of the time meter 6. If the opening of the needle valve 12 is not changed, this time depends only on the volume of gas contained in the receptacle 1, and this volume can be easily calculated according to the thermodynamic laws. Therefore, the time meter 6 can be directly graduated in units of volume.

The volume of liquid or gas contained in the receptacle 1 can also be determined in such a manner that if the difference of pressure has a definite initial value and is reduced during a certain time, the final value of pressure indicated by the manometer 7 depends only on the volume of gas contained in the receptacle 1 and can be calculated according to the thermodynamic laws. In this case the differential manometer 7 can be graduated in units of volume.

In Figure 2 the receptacle 1 filled partially with a liquid 2 and for the rest with a gas 3 is connected with the atmosphere through a pressure equalizing pipe 18. The resistance to flow in this pipe, which can be a capillary tube, can be changed by means of a needle valve 19. The device according to Fig. 2 includes, besides, the time meter 6, an ordinary manometer 20 which is connected with the receptacle 1 through a pipe 21 and which indicates the difference between the pressure of gas in the receptacle 1 and the atmospheric pressure. Moreover, the receptacle 1 is connected, by means of a pipe 22 containing a stop-valve 23, with a suction or pressure pump not illustrated in the drawing.

For determining the volume of liquid contained in the receptacle 1 the valve 23 is opened and the pump is working until a certain difference between the pressure in the receptacle 1 and the atmospheric pressure is indicated by the manometer 20. Thereafter the valve 23 is closed, and the difference of pressure can be equalized through the pipe 18.

In the same manner as it is described above the time, during which the difference of pressure is reduced to a certain value or the value to which the difference of pressure is reduced under a certain time from a certain initial value, can be calculated, and in the same way the time meter or the manometer can be graduated in units of volume.

The time and the difference of pressure measured by the time meter 6 and the differential manometer 7 depend on the present temperature and, besides, if the receptacle 1 is connected with the atmosphere, on the present atmospheric pressure. Therefore it is necessary to correct the indicated values of the time and of the difference of pressure in view of the temperature and eventually also of the atmospheric pressure. This disadvantage can be avoided by compensating arrangements.

Fig. 3 shows a profile 37 of a wing of an aeroplane provided with a fuel tank 38, an auxiliary receptacle 39 and a static pressure opening 41 which is generally so arranged that the chamber 40 is influenced by the atmospheric pressure and is independent of the movement of the aeroplane. The tank 38 and the auxiliary receptacle 39 which lie close to each other and have the same temperature are formed as pressure equalizing chambers which are combined with manometers 42 and 43 in the so-called variometer arrangement by means of which it is possible to measure the velocity of changes in pressure. For this purpose the manometers 42 and 43 are connected by means of a pipe system 44 with the chamber 40, the tank 38 is connected by means of a pipe 45 with the manometer 42 and by means of a pressure equalizing pipe 46 with the chamber 40, and the receptacle 39 is connected by means of a pipe 47 with the manometer 43 and by means of a pressure equalizing pipe 48 provided with an adjustable needle valve 49 with the chamber 40.

From the above it will be noted that manometers 42 and 43 are each connected to atmosphere on one side through pipes 44. The other side of manometer 42 is connected to respond to pressure within tank 38, while the corresponding side of manometer 43 is similarly connected to auxiliary tank 39. Tank 40 is provided solely so that the atmosphere side of the two manometers may be responsive to atmospheric pressure in a static zone as distinguished from directing the ends of pipe 44 to a zone where air currents about the air-craft might deleteriously affect the accuracy of the instrument.

If the aircraft moves from a lower to a higher altitude, there will be a time lag before pressure equalization exists as between tanks 38 and 39 and atmosphere. Furthermore, the time lag will vary in the case of tank 38, depending upon the gas space therein. In other words, tanks 38 and 39 have established therein a pressure different from that of atmosphere. The pressure existing in both tanks is initially the same and to obtain a determination of gas volume in tank 38, it is only necessary to observe comparatively the rate of pressure equalization between said receptacle and atmosphere.

As the ratio between the difference of pressure and the quantity of gas flowing through the pipes 46 and 48 in the unit of time is the same for these pipes, the measured value is not depending on the present atmospheric pressure and the present temperature. Therefore it is not necessary that the observer of the device correct the values read off.

In the case of Figure 3 it is necessary that the equalizing flows of gas continue a sufficiently long time in order that a state of equilibrium is attained, at which a further change of the atmospheric pressure does not produce a change of the difference between the pressure in the tank 38 and the receptacle 39. By suitably choosing the degree of sensitiveness of the manometers and the resistance to flow in the equalizing pipes the time after which the state of equilibrium is attained can be short.

Naturally instead of relying upon changes in the pressure between atmosphere and tanks 38 and 39 brought about by changes in elevation of the aircraft, a pumping arrangement, e. g. analogous to that shown in Figure 1 may be used so that the instrument is entirely independent of the altitude of the aircraft.

The embodiments of Figs. 1 to 3 in which all equalizing pipes may be capillary tubes or may have a restricted discharge opening, and the last of which is naturally applicable to motor cars, are only examples of the invention, which has also the advantage that the volumes of liquid contained in several receptacles can be determined by means of a common device arranged e. g. on the dash board of a motor car.

Having now particularly described the nature of our invention and the manner of its operation what we claim is:

1. A device for determining the volume of liquid in a receptacle containing a liquid and a gas which comprises means for placing the receptacle under a gaseous pressure different from that in an adjacent static pressure zone, means for venting said receptacle to vary the pressure difference between said receptacle and said zone, means for continuously measuring the pressure difference between the gas space of said receptacle and the adjacent static pressure zone, and a time measuring means, whereby the differential pressure drop per unit of time may be determined during venting and thereby the liquid volume in the liquid containing receptacle may be determined.

2. A device for determining the volume of liquid in a main receptacle containing a liquid and a gas under pressure, which comprises an auxiliary receptacle containing gas under pressure different from that in the main receptacle, a manometer, means connecting one side of said manometer to the gas space of the main receptacle and the other side thereof to the auxiliary receptacle, means establishing restricted communication between the gas spaces of the main receptacle and said auxiliary receptacle, and a time device for measuring the time of establishment of a different pressure difference between said two receptacles, which time will be a function of said pressures and the volume of the gas space in the main receptacle so that the liquid volume therein is determined.

3. A device for determining the volume of liquid in a receptacle containing a liquid and a gas under pressure different from atmospheric which comprises, an auxiliary receptacle of known volumetric capacity containing a gas under pressure equal to the gas pressure in the main receptacle, means establishing restricted communication between the gas spaces of each of said receptacles and atmosphere, a pair of manometers, one side of each manometer being open to atmosphere, means establishing communication between the gas zone of the main receptacle and the other side of one of the manometers, and means establishing communication between the auxiliary receptacle and the other side of the other manometer, whereby the rate of pressure equalization between said receptacles and atmosphere may be comparatively observed to afford information relative to the gas volume in the main receptacle which will vary inversely with the liquid volume therein.

TORE HELLEBERG.
SVEN MALMSTRÖM.